United States Patent [19]

Kordak

[11] Patent Number: 4,819,429
[45] Date of Patent: Apr. 11, 1989

[54] HYDRAULICAL DRIVE SYSTEM

[75] Inventor: Rolf Kordak, Lohr, Fed. Rep. of Germany

[73] Assignee: Mannesmann Rexroth GmbH, Lohr, Fed. Rep. of Germany

[21] Appl. No.: 453,932

[22] Filed: Dec. 28, 1982

[30] Foreign Application Priority Data

Jan. 22, 1982 [DE] Fed. Rep. of Germany ....... 3202015

[51] Int. Cl.$^4$ ............................................. F16D 31/02
[52] U.S. Cl. .................................... 60/414; 60/444; 60/447; 60/448; 60/449
[58] Field of Search ................. 60/413, 414, 447, 449, 60/476, 448, 475, 473; 91/505, 506; 92/12.2, 13.3

[56] References Cited

U.S. PATENT DOCUMENTS

| | | | |
|---|---|---|---|
| 3,095,757 | 7/1963 | Thoma | 91/506 |
| 3,411,294 | 11/1968 | Hedermann | 60/475 |
| 3,442,181 | 5/1969 | Olderaan | 92/12.2 |
| 3,611,712 | 10/1971 | Ifield | 60/431 |
| 4,342,164 | 8/1982 | Claasen | 60/475 |

FOREIGN PATENT DOCUMENTS

| | | | |
|---|---|---|---|
| 2739968 | 3/1979 | Fed. Rep. of Germany | 60/448 |
| 2808786 | 9/1979 | Fed. Rep. of Germany | 91/505 |
| 3021883 | 10/1981 | Fed. Rep. of Germany | . |
| 220417 | 8/1924 | United Kingdom | 91/505 |

Primary Examiner—Edward K. Look
Attorney, Agent, or Firm—Harness, Dickey & Pierce

[57] ABSTRACT

A hydraulic drive system to actuate the piston of a cylinder unit comprises a first hydrostatic machine having variable displacement, a second hydrostatic machine mechanically coupled to said first machine and operating as a signal generator either in a pump mode or a motor mode, and a third hydrostatic machine of fixed displacement mechanically coupled to said first machine, which third machine is hydraulically connected to said cylinder unit. In response to zero speed or rotation of the drive system the piston of the cylinder unit may be stopped in any position, or, respectively, raised or lowered. The variable displacement machine may operate as a pump and as a generator in which latter case energy is recovered in lowering a load.

8 Claims, 2 Drawing Sheets

HYDRAULICAL DRIVE SYSTEM

FIELD OF THE INVENTION

The present invention relates to a hydraulic drive system, comprising a hydrostatic machine of variable displacement, a signal generator to deliver a control signal to the displacement means of the machine which signal is responsive to the speed of the machine, wherein the signal generator is a hydrostatical machine either working in the pump or the motor mode which machine has a pair of ports, one port connected to a first cylinder space and the other port with the opposite second cylinder space of the adjusting unit of the displacement means, and further comprising a throttle which is either connected to the suction port or the pressure port of the signal generator, through which throttle the pressure fluid is delivered to the signal generator or removed therefrom, the cross section of the throttle determining the desired speed of the power unit.

PRIOR ART

The system indicated above is disclosed in German application No. 27 39 968. It allows a substantial saving of energy since the hydrostatic machine which is connected to a power source only draws so much energy from the power source which is necessary for the energy need of a load, whereas the hydraulical energy which is developed in the pumping mode of the machine is fed back to the hydraulical supply system or is stored in an accumulator. Accordingly, drive systems of this type incorporating hydrostatic power unit are particularly used for automotive and hoisting drives. As a matter of fact the drive system of the prior art referred to above delivers a torque at a shaft and is accordingly suitable only for a rotary drive. However, a number of applications need a hydraulic cylinder to obtain a linear motion.

SUMMARY OF THE INVENTION

Accordingly it is an object of the present invention to improve the drive system referred to above become capable of actuating a hydraulic cylinder thereby using the advantages of the known drive system.

These and other objects and features of the invention are set forth in the detailed description of a preferred embodiment to follow.

According to the teaching of the present invention the said hydrostatic power unit is mechanically coupled to a hydrostatical power unit having a fixed displacement which additional power unit is hydraulically connected to the working cylinder.

As long as said additional hydrostatic machine is not rotated, the piston of the working cylinder cannot move so that a load is maintained in a fixed position without a mechanical brake being applied. To this condition of operation the hydrostatic power unit of variable displacement volume must be set to generate a torque which equals the torque occuring at the additional power unit due to the load. This neutral operating condition in which the speed of both machines is zero is detected by the signal generator which applies an adjusting signal to the adjusting cylinder of the displacement means adjusting the position of the latter such that the speed of both machines is zero while the desired torque is produced. By means of a proportioning unit the displacement means of the hydraulic machine may be adjusted to control the speed of the power unit, the machine of fixed displacement operating as a pump to lift the load, whereas the fixed displacement machine operates as a motor to lower the load, the motor driving the power unit of variable displacement which feeds back energy into the power supply system or to an accumulator.

It should be understood that all advantages obtained with the rotary drive system of the prior art referred to above are fully maintained for the linear drive system to actuate a cylinder unit. The fluid proportioning device cooperating with the signal generator determines the speed of the piston of the cylinder, energy is recovered and accumulated when working as a generator and such amount of energy only is taken from the supply system as it is necessary to move the cylinder and to cover the losses of the machines. Furthermore the hydrostatic unit having a displacement variable in either direction from zero stroke to both forward and reverse flow operation to perform either in the pump or the motor mode the fixed displacement machine and the signal generator may be combined in a complete unit which has no mechanical input or output.

BRIEF DESCRIPTION OF THE DRAWINGS

Specific embodiments of the invention are described in detail below, are set forth by way of example only and should not be construed as to limit the scope of the invention which is defined in the appended claims. In the attached drawings

DETAILED DESCRIPTION

Figure 1:
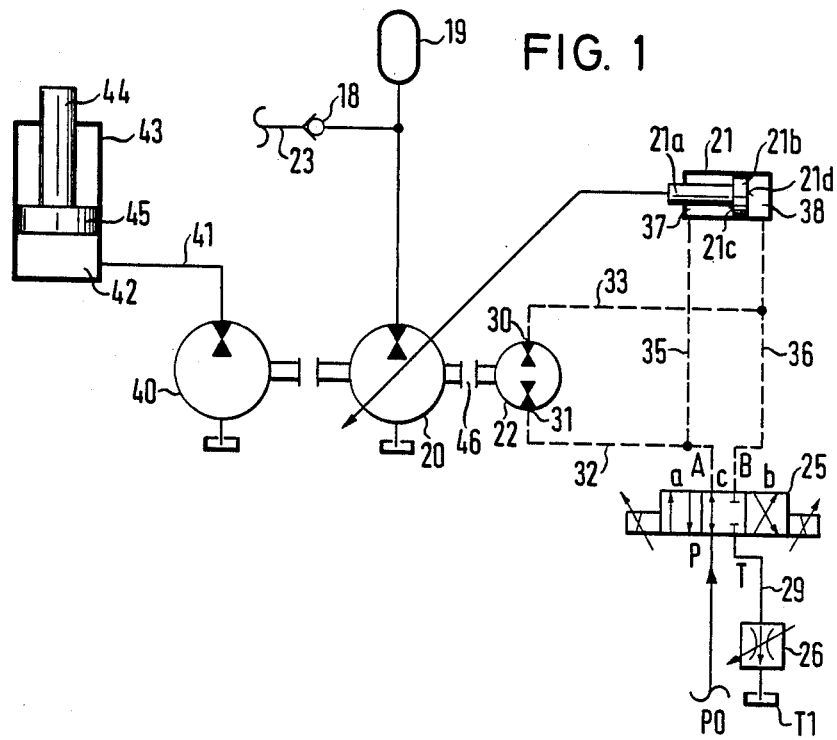
FIG. 1 shows a drive system for a single acting working cylinder.

FIG. 1 shows a hydrostatic drive system according to the invention which is supplied with fluid pressure through a pressure line 23. A check valve 18 is provided in the pressure line which check valve closes towards the primary pressure source not shown and an accumulator 19 is provided between the check valve 18 and a hydrostatic machine 20. The displacement of the machine 20 is controlled by a cylinder 21. The machine 20 is mechanically coupled to a signal generator which is defined by a hydrostatic machine 22 having ports 30 and 31 which are connected through control lines 32,33 to the supply lines 35,36 leading to the cylinder 21. The supply line 35 opens into the cylinder space 37 through which the piston rod 21a extends, whereas the supply line 36 opens into the cylinder space 38 adjacent the piston of the cylinder 21. The other end of the supply line 35 is connected to port A and the other end of the supply line 36 is connected to the port B of a 4 way direction control valve 25 having three positions a,b,c.

The port P of the valve 25 is connected to a control power source, P0 and the port T is connected through line 29 to the reservoir T1. In this line 29 there is an adjustable flow regulator valve 26 which controls the control fluid returning to the reservoir T1.

The machine 20 is further coupled to a hydrostatical machine 40 of fixed displacement which is hydrostatic connected through line 41 with the cylinder space 42 of a single acting working cylinder 43 which piston rod 44 drives a load.

Assuming that the 4 way directional control valve 25 is in the intermediate position c as shown, the cylinder space 37 of the cylinder 21 is connected through the supply line 35 to the control power source P0. The supply line 36 to the cylinder space 38 of the cylinder is closed off in the position of the valve so that the control pressure in space 37 acts on the piston 21b which is backed up by the fluid filling space 38, the piston thus taking a stop position.

Now when fluid of a predetermined pressure is supplied from a primary source through line 23 to the machine 20 the latter generates a torque corresponding to this pressure and the position of the piston rod 21a of the cylinder 21. Depending on the rotational direction of the fixed displacement machine 40 and the machine 20 which are mechanically connected to each other fluid either flows to the space 42 of the cylinder 43 through line 41 or is removed therefrom. Correspondingly the piston rod 44 is moved into one or the other direction. The shaft of the machine 20 is connected through a coupling member 46 to the signal generator 22 which is rotated in the same speed as the machine 20. Since the port 31 of the signal generator is connected through lines 33, 36 to the space 38 control fluid is fed into said space 38 or is removed therefrom in accordance with the speed of the signal generator. Accordingly a corresponding displacement of the piston rod 21a takes place. More particular the piston rod is moved to a position in which the machine 20 generates a torque which is in opposition to and equals the torque applied to the shaft. As soon as zero speed of the machine 20 and of the signal generator is obtained the latter cannot feed fluid to the space 38 of the cylinder or remove fluid therefrom. Accordingly the drive system has reached a stationary equilibrium. A control pressure acts in space 38 to bring the piston 21b of the cylinder into the equilibrium position in which the fixed displacement machine 40 has zero speed so that the piston 45 of the working cylinder 43 is in a stop position at any load.

Upon actuation of the valve 25 from the intermediate position c to the position a a predetermined control fluid volume flows to the reservoir T1 as determined by the metering means 26 in line 29. Accordingly the pressure in space 38 is released through supply line 36 to reservoir. This means that piston 21b is moved towards space 38 as space 37 is still supplied with pressure from control pressure source P0 to adjust the machine 20 causing a rotation which drives the fixed displacement machine 40 as well as the signal generator 22. The latter operates as a motor and causes a flow of fluid from line 32 to line 33 and from there through the valve 25 and the metering means 26 to reservoir T1.

Upstream of the metering valve 26 a pressure is developed which is determined by the cross sectional area of the flow regulating device 26 and by the flow of control fluid volume therethrough. With a predetermined adjustment of the metering valve the pressure increases in response to an increasing control fluid volume which pressure is supplied through supply line 36 to the space 38 of the cylinder. Since the volume is determined by the speed of the signal generator 22 the pressure of the control fluid is directly responsive to the speed of the signal generator 22 and of the machine 20. When the control pressure in space 38 reaches a value at which piston 21b comes to a stop under the equilibrium of forces the speed of the machine 20 cannot be further increased as this would result in a further increase of the control pressure which would adjust the piston into the direction of lower speed of the machine. Accordingly the control fluid volume being returned through the metering valve 26 determines the speed of both machines 20 and 40 which displacement volume controls the speed of movement of the piston 45.

The displacement volume of the machine 20 is adjusted in response to the torque applied to the shaft to a value such that the speed is reached which is adjusted at the metering valve 26. Any change of the load results in a change of speed and thus of the torque applied to the shaft which positively effects a change of the control pressure in space 38 of the cylinder by means of the signal generator 22 moving the piston 21b into a position in which the machine 20 is adjusted to the speed which is predetermined at metering valve 26.

For a reversed rotation of the machine 20 the valve 25 is actuated to take the position b in which the space 38 is connected to the control fluid source P0. For an equilibrium of forces at piston b a higher pressure in opposition to the control pressure P0 must prevail in space 37. This is achieved by the signal generator 22 which now operates as a pump in contrast to its motor operation wherein the control fluid is transmitted from a higher to a lower level. The controlling operation, however, is identical in both rotational directions. Furthermore, the control stability is the same. In the position b the piston 45 of the cylinder is retracted and fluid is displaced from the space 42 through line 41 to drive the machine 40 which operates as motor driving the machine 20 which operates as pump feeding the displaced fluid into the accumulator 19 or to an other load. In this position of the valve the moving speed of the piston 45 is again depending on the adjustment of the metering valve 26.

Figure 2:
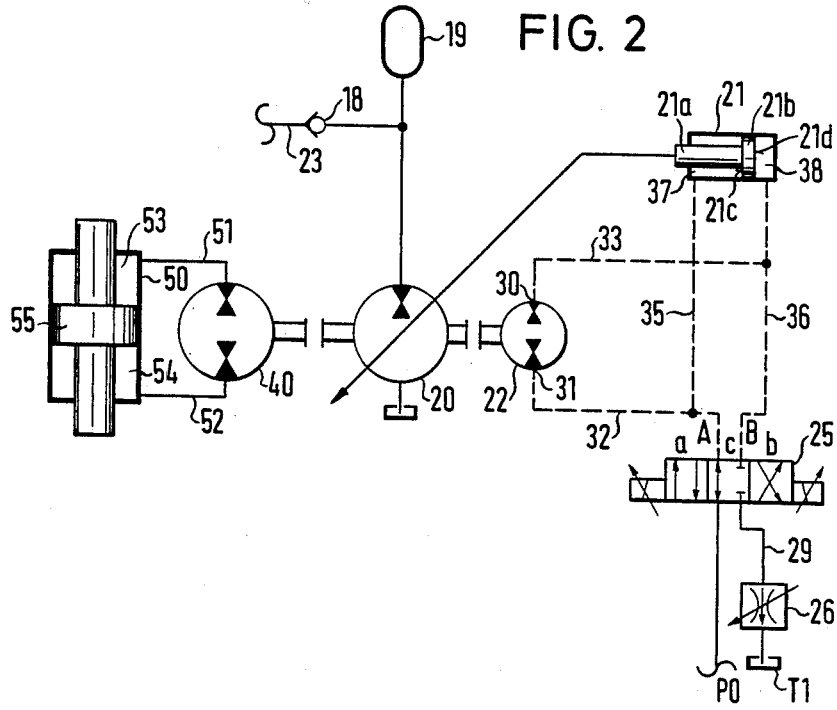
FIG. 2 shows a drive system for a double acting working cylinder.

FIG. 2 shows a drive system for a double acting cylinder 50 wherein the fixed displacement machine 40 is hydraulically connected via a line 51,52 each to the spaces 53,54 of the cylinder 50. All other components shown correspond to the system shown and explained in FIG. 1. When the fixed displacement machine 40 operates as a pump the liquid displaced from space 53 is fed through line 52 into space 54 and the piston 55 is consequently raised. Contrarily, when the machine 40 operates as a motor, the machine 20 is driven feeding fluid to the accumulator 19.

Figure 3:
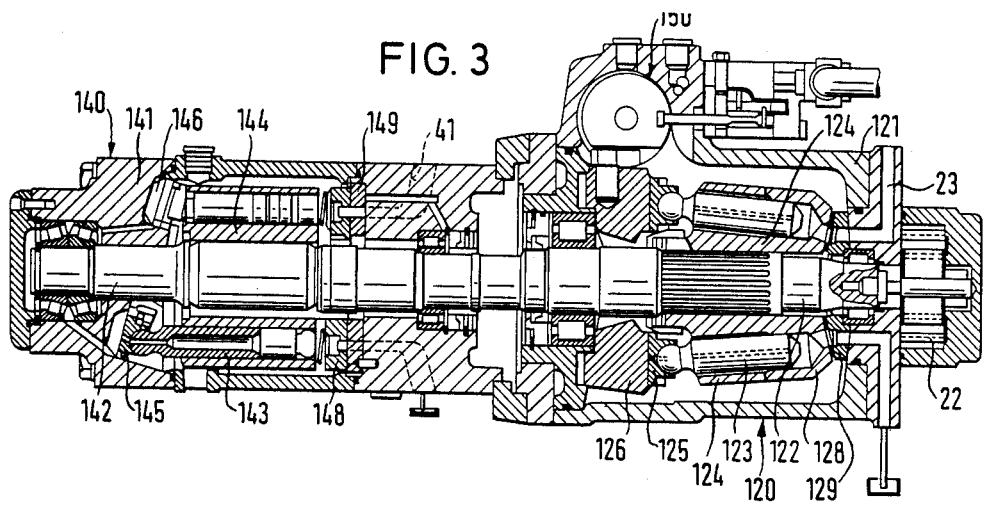
FIG. 3 shows a section through a drive system in a first embodiment and FIG. 4 shows a section through a drive system in a second embodiment.

FIG. 3 shows an axial section through a hydrostatic unit comprising a fixed displacement machine 140 and a variable displacement machine 120. Both machines are well-known to the artisan.

The fixed displacement machine 140 is an axial piston machine having a casing 141 in which a number of pistons 143 are accommodated in parallel relationship to the shaft 142. The pistons run in a cylindrical drum 144 which is rigidly mounted on the shaft 142. The piston ends are shaped to define spherical pivots which are supported in sliding shoes 145. The sliding shoes are held in contact with an inclined surface 146 which is part of the casing and has a fixed inclination.

In rotating the drive shaft 142 rotation is applied to the drum 144, the pistons 143 and sliding shoes 145. As the pistons are held on the inclined surface 146 through the sliding shoes rotating the shaft results in the pistons exercising a stroke in the drum.

Control is effected in supplying and removing liquid through a pair of kidney shaped slots in a control plate 149 which is rigidly mounted to the casing, the bottom portion 148 of the pistons having correspondingly shaped openings.

The mode of operation of the axial piston machine is well-known. When the shaft 142 is rotatably driven the pistons outwardly moving with respect to the drum are connected through the control port to the reservoir thus taking in liquid. The other pistons are connected to the pressure port through the other control slot to displace liquid to the pressure port by retracting with respect to the drum. The machine operates as a pump. In motor operation, however, pressure fluid is supplied to the machine actuating the pistons moving outwardly with respect to the drum so that the drum and thus the shaft 142 are rotatably driven.

The shaft 142 is coupled to the shaft 122 of the variable displacement axial piston pump 120 which casing 121 is connected through a flange to the casing 141. Again, the variable displacement machine 120 includes pistons 123, a drum 124, sliding shoes 125, a swash plate 126, a bottom portion 120 having openings and a control plate 129 having kidney shaped slots which are connected to the supply and release ports of the fluid. A hydraulical adjustment means 150 actuates the swash plate 126 to adjust it from a neutral position in which the displaced volume is zero to certain angles of inclination into both directions to adjust the stroke of the pistons 123. The stroke determines the amount of volume displaced. The piston stroke increases with increasing angles of inclination.

According to the embodiment of FIG. 3 both shafts 122 and 142 may have free ends extending from the casing. For example the signal generator 22 is coupled to one end of the shaft, whereas the other end may be connected with an auxiliary pump. The machine 120 has a maximum angle of inclination of 18°. The advantage of this system should be seen in the space saving structure as well as in a simple design and cost saving production. In particular, this unit is suitable for smaller modules which do not have excessive volumes of displacement.

Figure 4:
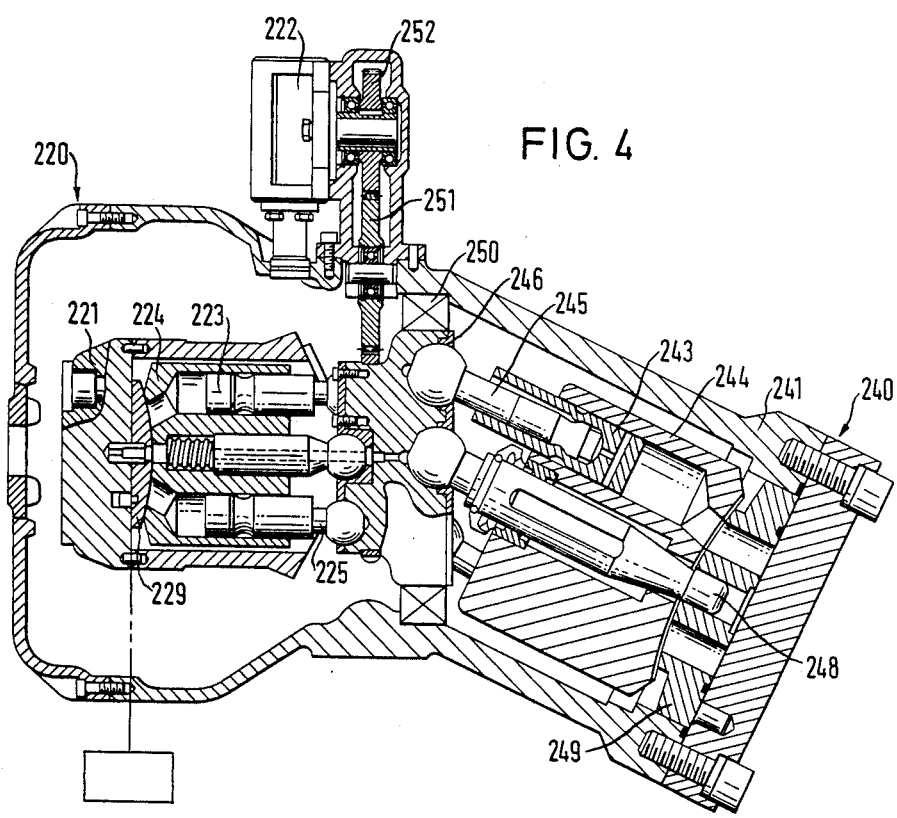

FIG. 4 shows the combination of an axial piston machine 240 having fixed displacement and an axial piston machine 220 of bent axis design having a variable displacement. The casing 241 of the machine 240 accommodates the drum 244 including the piston 243 including piston rods 245 having spherical pivots, further a stroke disc 246 and a control plate 249. The stroke disc 246 receives the spherical ends of the piston rods 245. The cylinder 244 is centrally supported on a pin 248.

The axial piston machine 220 of variable displacement includes a casing 221, a drum 224 and pistons 223 which piston rods 225 are received in recesses of the stroke disc 246. The drum 224 cooperates with a control plate 229. FIG. 4 shows the pivotal casing 221 including the drum 224 and the piston in a neutral position, from which it may be pivoted upwardly and downwardly by an adjusting means not shown. Corresponding to the pivotal angle the pistons 223 perform a corresponding stroke in the cylinder. The stroke and consequently the displaced volume of liquid increase with increasing pivotal angle.

The stroke disc is rotatably and axially supported in the casing by means of a bearing 250. This unit has no shaft extending outwardly through the casing, but is rather provided with a single stroke disc 246 cooperating with the pistons of both machines. Compared with the unit of FIG. 3 the modules shown in FIG. 4 need a larger space, but the machine allows for substantially larger pivotal angles resulting in a substantially increased working range of the speed. Further, those machines are provided for higher capacities. The signal generator 222 which is a small hydrostatic machine is mounted at a side of the casing and is rotatably driven from the stroke disc 246 through a pair of gear wheels 251 and 252.

I claim:

1. A hydraulical drive system, comprising a hydrostatic machine of variable displacement, an adjusting device coacting with said machine to vary the displacement thereof, a signal generator comprising a hydrostatic machine selectively operating either as a pump or as a motor, said signal generator delivering a signal in response to the speed of said variable displacement machine to said adjusting device including a cylinder, wherein a first port of the signal generator is hydraulically connected to a first cylinder space and a second port of the signal generator is hydraulically connected to the opposite second space of said adjusting cylinder, further comprising a metering means hydraulically connected to said first and second ports of said signal generator to supply fluid to said signal generator or to remove fluid therefrom, said metering means having a flow cross section determining the desired speed of said variable displacement machine, characterized in that said signal generator is mechanically coupled to said variable displacement machine for simultaneous rotation therewith, a hydrostatic fixed displacement machine is provided which is mechanically connected to the hydrostatic variable displacement machine and which is hydraulically connected to a load in the form of a working cylinder, said fixed displacement machine being operative as either a pump or a motor and accumulative means for receiving pressurized fluid from said variable displacement hydrostatic machine when driven as a pump by said fixed displacement hydrostatic machine as a motor.

2. A hydraulical drive system of claim 1 incorporating a single acting working cylinder, wherein the hydrostatic machine of fixed displacement includes a first port connected to the working cylinder and a second port connected to the reservoir.

3. The hydraulical drive system of claim 1 incorporating a double acting working cylinder, wherein the hydrostatic fixed displacement machine has a first port which is connected to a first cylinder space and a second port connected to the opposite space of said working cylinder.

4. The hydraulical drive system of claim 1, wherein said hydrostatic machines are axial piston type machines having shafts which are mechanically connected to each other, the first axial piston machine comprising a swash plate pivotally adjustable from a neutral forward position towards both directions of adjustment for and reverse flow, and the second axial piston machine comprising a stationary swash plate, one of said machines having the shaft extending through the casing for mounting said signal generator.

5. The hydraulical drive system of claim 1, wherein said hydrostatic machines are a pair of axial piston machines comprising a common stroke disc which is rotatably supported in a casing, said stroke disc cooperating with the pistons of both machines and the pistons of the variable displacement machine being received in a cylinder which is pivotally adjusted from a neutral position towards both directions of flow.

6. The system of claim 5 wherein the signal generator is driven by the said stroke disc common to both pistons which signal generator is mounted to the casing of the axial piston machines.

7. The hydraulical system of claim 6, wherein the signal generator is driven by the stroke disc through gear wheels.

8. The hydraulical system of claim 5, wherein the stroke disc is rotatably supported in the casing by a radial and axial type bearing.

* * * * *